United States Patent
He et al.

(10) Patent No.: US 11,403,206 B2
(45) Date of Patent: Aug. 2, 2022

(54) METHOD AND APPARATUS FOR DEBUGGING, AND SYSTEM ON CHIP

(71) Applicant: HANGZHOU FABU TECHNOLOGY CO., LTD., Hangzhou (CN)

(72) Inventors: Xiaofei He, Hangzhou (CN); Siddartha Kavilipati, Tempe, AZ (US); Bahaa Osman, Tempe, AZ (US)

(73) Assignee: HANGZHOU FABU TECHNOLOGY CO., LTD., Hangzhou (CN)

( * ) Notice: Subject to any disclaimer, the term of this patent is extended or adjusted under 35 U.S.C. 154(b) by 621 days.

(21) Appl. No.: 16/409,749

(22) Filed: May 10, 2019

(65) Prior Publication Data
US 2020/0301819 A1 Sep. 24, 2020

Related U.S. Application Data

(63) Continuation of application No. PCT/CN2019/079075, filed on Mar. 21, 2019.

(51) Int. Cl.
*G06F 11/00* (2006.01)
*G06F 11/36* (2006.01)
*G06N 3/04* (2006.01)

(52) U.S. Cl.
CPC ........... *G06F 11/3636* (2013.01); *G06N 3/04* (2013.01)

(58) Field of Classification Search
CPC .. G06F 11/3636; G06F 11/36; G06F 11/3612; G06F 11/362; G06F 11/3648; G06N 3/04
See application file for complete search history.

(56) References Cited

U.S. PATENT DOCUMENTS

| | | | |
|---|---|---|---|
| 11,086,816 B2 * | 8/2021 | Fleming | G06F 15/825 |
| 2006/0248391 A1 * | 11/2006 | Glover | G06F 11/3648 714/30 |
| 2012/0144240 A1 * | 6/2012 | Rentschler | G06F 11/3636 714/34 |
| 2013/0036331 A1 | 2/2013 | Zhang et al. | |
| 2013/0297975 A1 | 11/2013 | Kilzer et al. | |
| 2018/0253368 A1 * | 9/2018 | Villarreal | G06F 11/3648 |
| 2019/0228308 A1 * | 7/2019 | Zhou | H04L 12/40013 |
| 2019/0258251 A1 * | 8/2019 | Ditty | G06K 9/00805 |
| 2019/0354462 A1 * | 11/2019 | Peck | G06F 11/3644 |

FOREIGN PATENT DOCUMENTS

| | | |
|---|---|---|
| WO | 2017/050287 A1 | 3/2017 |
| WO | 2017202083 A1 | 11/2017 |
| WO | 2018/081145 A1 | 5/2018 |

\* cited by examiner

*Primary Examiner* — Joseph D Manoskey
(74) *Attorney, Agent, or Firm* — J.C. Patents

(57) ABSTRACT

Provided are a method and an apparatus for debugging, and a system on chip. The method for debugging includes: a component to be debugged receives a debugging instruction from a controller, and the component to be debugged performs debugging operation according to the debugging instruction and configuration of a state machine inside the component to be debugged. Then an SW level debugging operation of component on system on chip can be achieved, which improves the debugging efficiency of these components with large amounts of data flow on system on chip.

11 Claims, 8 Drawing Sheets

METHOD AND APPARATUS FOR DEBUGGING, AND SYSTEM ON CHIP

CROSS-REFERENCE TO RELATED APPLICATIONS

This application is a continuation of International Application No. PCT/CN2019/079075, filed on Mar. 21, 2019, entitled "METHOD AND APPARATUS FOR DEBUGGING, AND SYSTEM ON CHIP", the content of which is incorporated herein by reference in its entirety.

TECHNICAL FIELD

The present application relates to the technical field of debugging, and in particular, to a method and an apparatus for debugging, and a system on chip.

BACKGROUND

With the development of artificial intelligence (AI), some computations in AI can be completed by a variety of components disposed on a system on chip (SoC), for example, some computations in AI can be accelerated through the use of AI accelerator(s) implemented with CPU, GPU, field-programmable gate array (FPGA), application specific integrated circuit (ASIC), or the arbitrary combination thereof.

At present, deep neural networks (DNNs) run on AI accelerators, and the most popular DNN is Convolution neural networks (CNNs). CNNs are a sequence of layers, stacked to form task graphs in deep learning algorithms. With advent of using deep learning algorithms for autonomous driving, CNNs are getting deeper by adding more layers to the network to improve accuracy. Each layer is a set of mathematical operations transforming one three dimensional input data to another. Each layer is further decomposed to tiles to fit on-die memory dimensions. Post silicon bugs in AI accelerators are very hard to debug considering the large amounts of data flowing through several modules internal to the system on chip. Typical data flow requirements for a deep learning algorithm runs to multiple GBytes.

Therefore, the debugging efficiency of these components with large amounts of data flow on system on chip is very low.

This background information is provided to reveal information believed by the applicant to be of possible relevance to the present application. No admission is necessarily intended, nor should be construed, that any of the preceding information constitutes prior art against the present application.

SUMMARY

In view of the above, in order to overcome the above problem, the present application provides a method, an apparatus and a system on chip.

The foregoing and other objects are achieved by the subject matter of the independent claims. Further implementation forms are apparent from the dependent claims, the description and the figures.

A first aspect of the present application relates to a method for debugging, the method includes: receiving, by a component to be debugged, a debugging instruction from a controller; performing, by the component to be debugged, debugging operation according to the debugging instruction and configuration of a state machine inside the component to be debugged.

A second aspect of the present application relates to a method for debugging, the method includes: transmitting, by a controller, a debugging instruction to a component to be debugged; reading, by the controller, debugging information from the component to be debugged, where the debugging information is generated according to the debugging instruction and configuration of a state machine inside the component to be debugged.

A third aspect of the present application relates to a component to be debugged, the component to be debugged includes a receiving unit and a performing unit. The receiving unit is configured to receive a debugging instruction from a controller; the performing unit is configured to perform debugging operation according to the debugging instruction and configuration of a state machine inside the component to be debugged.

A fourth aspect of the present application relates to a controller, the controller includes a transmitting unit and a reading unit. The transmitting unit is configured to transmit a debugging instruction to a component to be debugged, the reading unit is configured to read debugging information from the component to be debugged, where the debugging information is generated according to the debugging instruction and configuration of a state machine inside the component to be debugged.

A fifth aspect of the present application relates to a component to be debugged, the component to be debugged includes an interface means, a processor means and a state machine means. The interface means is configured to receive a debugging instruction from a controller, the processor means configured to perform debugging operation according to the debugging instruction and configuration of the state machine means.

A sixth aspect of the present application relates to a controller, the controller includes an interface means and a processor means, the interface means is configured to transmit a debugging instruction to a component to be debugged, the processor means is configured to read debugging information from the component to be debugged, where the debugging information is generated according to the debugging instruction and configuration of a state machine inside the component to be debugged.

A seventh aspect of the present application relates to a system on chip, the system on chip includes the component to be debugged according to third aspect or fifth aspect and the controller according to the fourth aspect or the sixth aspect.

With the method, the apparatus and the system on chip provided in the present application, an SW level debugging operation of component on system on chip can be achieved, which improves the debugging efficiency of these components with large amounts of data flow on system on chip.

BRIEF DESCRIPTION OF DRAWINGS

The accompanying drawings are used to provide a further understanding of the present application, constitute a part of the specification, and are used to explain the present application together with the following specific embodiments, but should not be construed as limiting the present application.

DESCRIPTION OF EMBODIMENTS

In the following description, reference is made to the accompanying figures, which form part of the disclosure, and which show, by way of illustration, specific aspects of embodiments of the present application or specific aspects in which embodiments of the present application may be used. It is understood that embodiments of the present application may be used in other aspects and comprise structural or logical changes not depicted in the figures. The following detailed description, therefore, is not to be taken in a limiting sense, and the scope of the present application is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

There are a variety of hardware (HW) components disposed on system on chip need to be debugged, such as AI accelerators. In prior art, debugging of these components involves post processing the output data to decipher and debug HW results. There is no mechanism capable of obtaining intermediate debugging results. Therefore, the debugging efficiency of these components with large amounts of data flow on system on chip is very low.

The present application introduces breakpoint, step-in, step-out, jump, pause, resume features for logic function executing on the component to be debugged, mimicking typical software (SW) implementation debug capabilities with trace buffers, which improves the debugging efficiency of these components with large amounts of data flow on system on chip.

Figure 1:
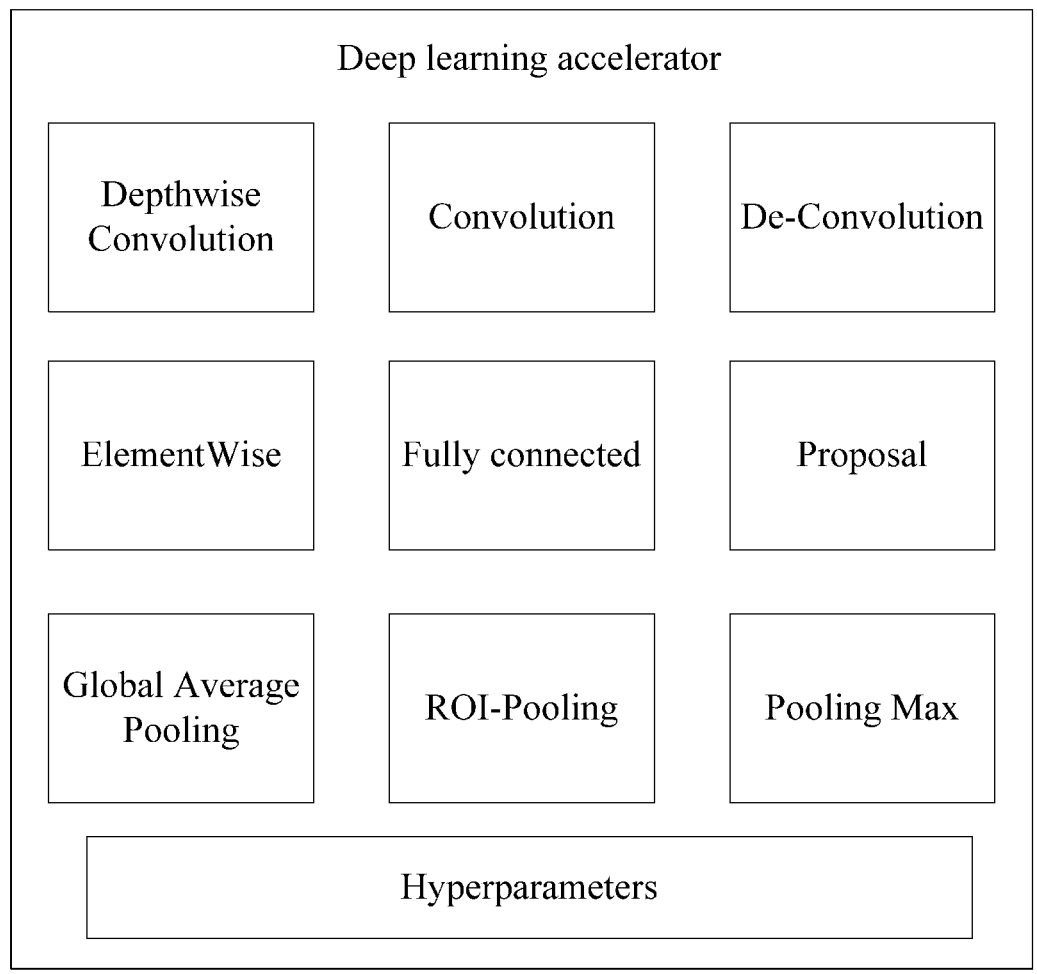
FIG. 1 is a schematic view of a deep learning accelerator (DLA)

The component most needed to improve debugging efficiency is the AI accelerator running DNNs. FIG. 1 is a schematic view of a DLA, DLA consists of hardware primitive blocks as shown in FIG. 1, the hardware primitive blocks sharing HW resources like multiplier and accumulator (MAC) units, memory buffers, adders etc. The DLA implements a DNN graph on the hardware primitive blocks. DNN graph is a combination of multiple layers (like convolution, pooling-max, fully connected etc.), hardware implements these hardware primitives and a global control logic implements a state machine to execute the graphs based on programmable registers which stores the graph information called hyperparameters representing inputs for each layer, behavior of the layers like stride, padding, apply rectified linear unit (ReLu)/Bias settings etc. the present application introduces breakpoint, step-in, step-out, jump, pause, resume features for DNN graph executing on the component to be debugged, mimicking typical SW implementation debug capabilities with trace buffers, which is achieved by changing this architecture through allowing the global control logic implements the state machine to pause after each tile mimicking breakpoints in SW and step functions. Internal buffers store the results which can act as trace buffers that can be dumped to review the intermediate execution results.

Figure 2:
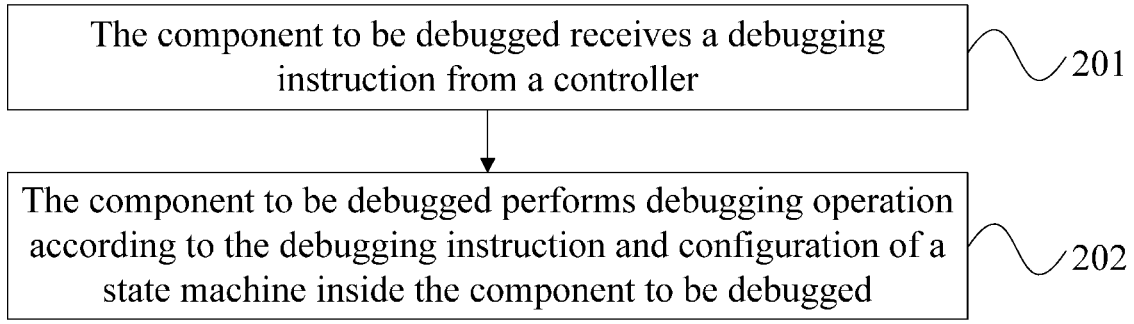
FIG. 2 is a schematic flowchart of a first method for debugging according to an embodiment of the present application.

FIG. 2 is a schematic flowchart of a first method for debugging according to an embodiment of the present application. FIG. 2 shows a method executed by a component to be debugged. It should be noted that the component to be debugged can be any component to be debugged on system on chip, for example, an AI accelerator, and the controller can be any component having control function, for example, a CPU.

The method includes the following steps:

S201: the component to be debugged receives a debugging instruction from a controller.

First of all, the debugging process is initiated by the controller.

S202: the component to be debugged performs debugging operation according to the debugging instruction and configuration of a state machine inside the component to be debugged.

Since the debugging process of present application mimics typical SW debugging process, the state machine inside the component to be debugged need to be configured in advance to achieve breakpoint, step-in, step-out, jump, pause, resume features like typical SW debugging process. Once the component to be debugged receives a debugging instruction from the controller, the component to be debugged performs debugging operation according to the debugging instruction and configuration of a state machine inside the component to be debugged.

It should be noted that the state machine inside the component to be debugged could be state machine already set inside the component to be debugged which can be configured in advance, or newly added state machine, which is not limited in any one of the embodiments of the present application unless otherwise specified.

The present application provides a method for debugging, where the component to be debugged receives a debugging instruction from a controller, and performs debugging operation according to the debugging instruction and configuration of a state machine inside the component to be debugged. Then an SW level debugging operation of component on system on chip can be achieved, which improves the debugging efficiency of these components with large amounts of data flow on system on chip.

Figure 3:
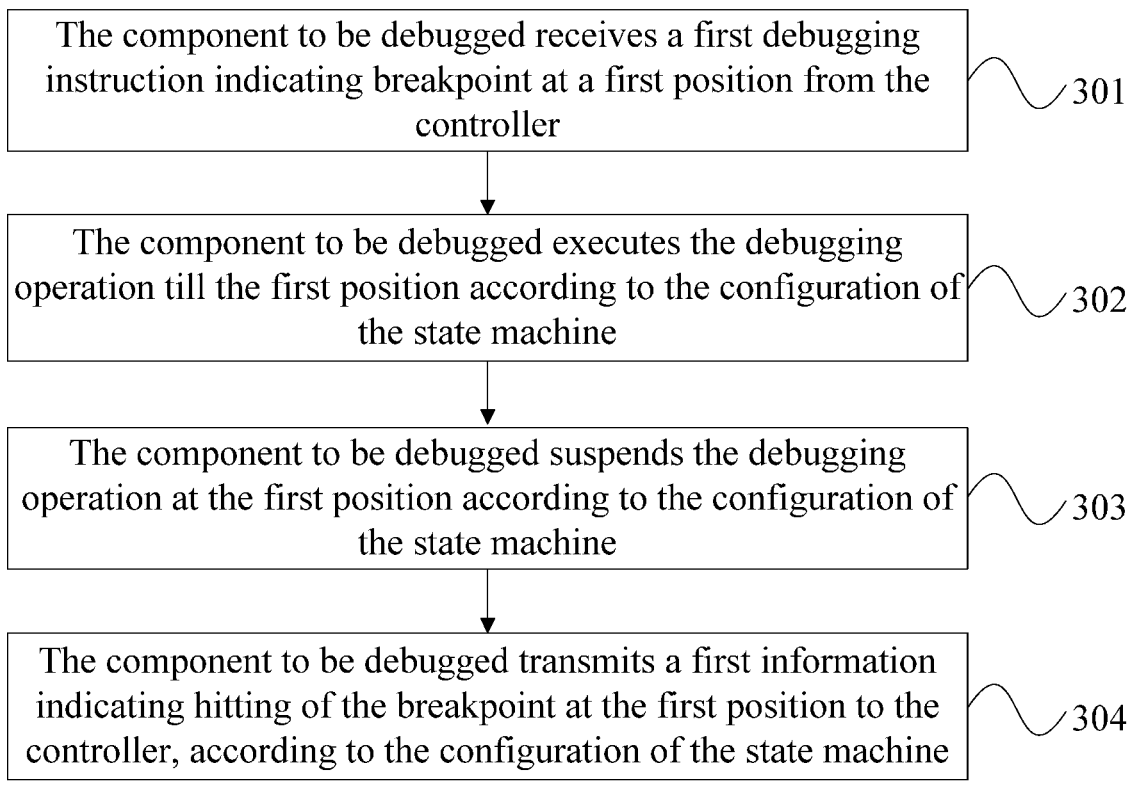
FIG. 3 is a schematic flowchart of a second method for debugging according to an embodiment of the present application.

FIG. 3 is a schematic flowchart of a second method for debugging according to an embodiment of the present application. This method shows an interaction operation between a component to be debugged and a controller when a first debugging instruction indicating breakpoint at a first position is received. It should be noted that the component to be debugged can be any component to be debugged on system on chip, for example, an AI accelerator, and the controller can be any component having control function, for example, a CPU.

The method includes the following steps:

5301: the component to be debugged receives a first debugging instruction indicating breakpoint at a first position from the controller.

Breakpoint in debugging process can make the debugging process to be interrupted at a point where needed to facilitate analysis.

S302: the component to be debugged executes the debugging operation till the first position according to the configuration of the state machine.

S303: the component to be debugged suspends the debugging operation at the first position according to the configuration of the state machine.

S304: the component to be debugged transmits a first information indicating hitting of the breakpoint at the first position to the controller, according to the configuration of the state machine.

According to this embodiment, after the controller receives the first information indicating hitting of the breakpoint at the first position from the component to be debugged, the controller would read debugging information from the component to be debugged, for example, from the internal buffers and status registers inside the component to be debugged. Then the intermediate debugging results can be obtained for analyzing, which improves the debugging efficiency of these components with large amounts of data flow on system on chip.

In one possible implementation, where the debugging instruction includes a second debugging instruction indicating stepping at a second position, the S202 can be the component to be debugged executes the debugging operation at the second position according to the configuration of the state machine.

In this possible implementation, after receiving a second debugging instruction indicating stepping to a second position from the controller, the component to be debugged mimics step function of typical SW debugging to step to next position.

In one possible implementation, the debugging instruction includes a third debugging instruction indicating resuming the debugging operation, the S202 can be the component to be debugged resumes the debugging operation according to the configuration of the state machine.

In this possible implementation, after receiving a third debugging instruction indicating resuming the debugging operation from the controller, the component to be debugged mimics resume function of typical SW debugging to resume the debugging operation according to the configuration of the state machine.

It should be noted that the embodiments shown in FIG. 2 and FIG. 3 and the possible implementations cited above can be implemented individually or implemented sequentially, which is not limited in the present application.

In one possible implementation, the component to be debugged includes an accelerator running a DNN, where the first position includes tile Y of layer X or layer X, where X and Y are positive integer greater than 1, the second position is tile Y+1 or layer X+1.

Figure 4:
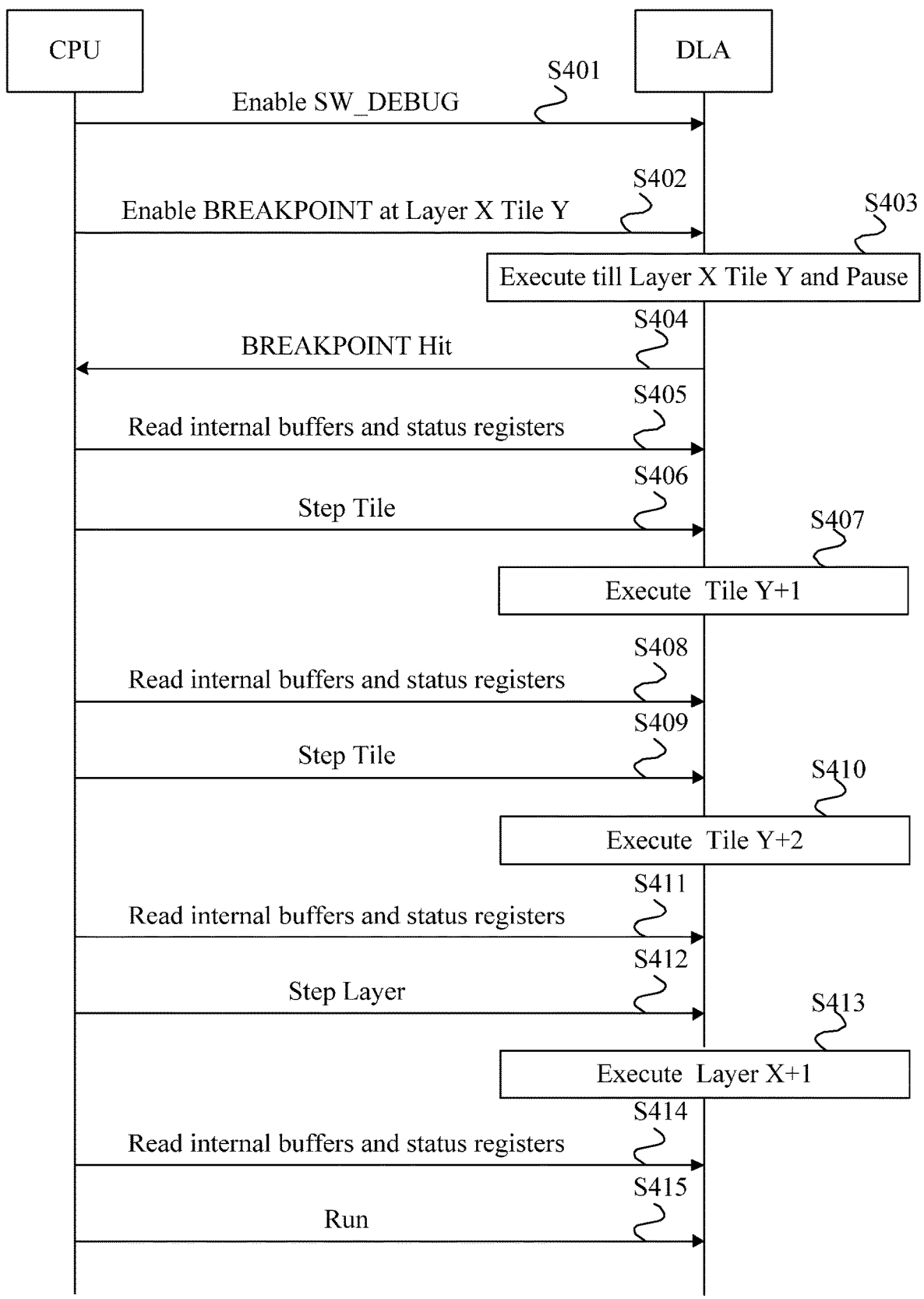
FIG. 4 is a schematic flowchart of a third method for debugging according to an embodiment of the present application.

FIG. 4 is a schematic flowchart of a third method for debugging according to an embodiment of the present application. Following will describe an example scenario where the component to be debugged is an AI accelerator running DNN (such as DLA), and the controller is a CPU in conjunction with FIG. 4.

The method includes the following steps:

5401: the CPU enables SW DEBUG.

This step is implemented by the CPU transmitting a debugging instruction indicates that the debugging operation could be started.

5402: the CPU enables BREAKPOINT at Layer X Tile Y.

5403: the DLA executes till layer X tile Y and pauses.

5404: the DLA transmits a BREAKPOINT hitting information to the CPU.

5405: the CPU reads internal buffers and status registers.

At present, DNNs run on AI accelerators, and the most popular DNN is CNNs. CNNs are a sequence of layers, stacked to form task graphs in deep learning algorithms. With advent of using deep learning algorithms for autonomous driving, CNNs are getting deeper by adding more layers to the network to improve accuracy. Each layer is a set of mathematical operations transforming one three dimensional input data to another. Each layer is further decomposed to tiles to fit on-die memory dimensions. In an example scenario of BREAKPOINT debugging, the state machine inside the DLA should be configured in advance to set a BREAKPOINT at layer X tile Y. Once a debugging instruction indicating breakpoint at layer X tile Y is received, the DLA executes the debugging operation till layer X tile Y, suspends the debugging operation at layer X tile Y, and transmits a BREAKPOINT hitting information to the CPU. After the debugging operation paused at layer X tile Y, the CPU reads internal buffers and status registers for debugging information to analyze.

S406: the CPU transmits step tile instruction to the DLA.

S407: the DLA executes tile Y+1.

S408: the CPU reads internal buffers and status registers.

In an example scenario of STEP debugging, the state machine inside the DLA should be configured in advance to set a step length as one tile. Once a debugging instruction indicating stepping to next tile, the DLA executes tile Y+1. Then the CPU reads internal buffers and status registers for debugging information to analyze.

S409: the CPU transmits step tile instruction to the DLA.

S410: the DLA executes tile Y+2.

S411: the CPU reads internal buffers and status registers.

S409-S411 is similar to S406-S408.

S412: the CPU transmits step layer instruction to the DLA.

S413: the DLA executes layer X+1.

S414: the CPU reads internal buffers and status registers.

In an example scenario of STEP debugging, the state machine inside the DLA should be configured in advance to set a step length as one layer. Once a debugging instruction indicating stepping to next layer, the DLA executes layer X+1. Then the CPU reads internal buffers and status registers for debugging information to analyze.

S415: the CPU transmits running instruction to the DLA.

This architecture for debugging gives SW level debug features for deep learning algorithms which handles tens of layers with tens of tiles within micro-secs for each layer.

In this design, HW architecture can also allow pause/resume features and set up breakpoints. Chip structure allows configuration per layer, HW counters in state machine implemented in HW executes as per user configuration for set breakpoints and SW issued pause/resume commands per tile. Tile is similar to a single operation in SW where step function allows stepping to next op command.

According to this embodiment, the debugging operation of one layer is completed through the interaction between the CPU and the DLA, then an SW level debugging operation of component on system on chip can be achieved, which improves the debugging efficiency of these components with large amounts of data flow on system on chip.

It should be noted that the debugging result can be used to modify the deep learning algorithm where necessary.

Figure 5:
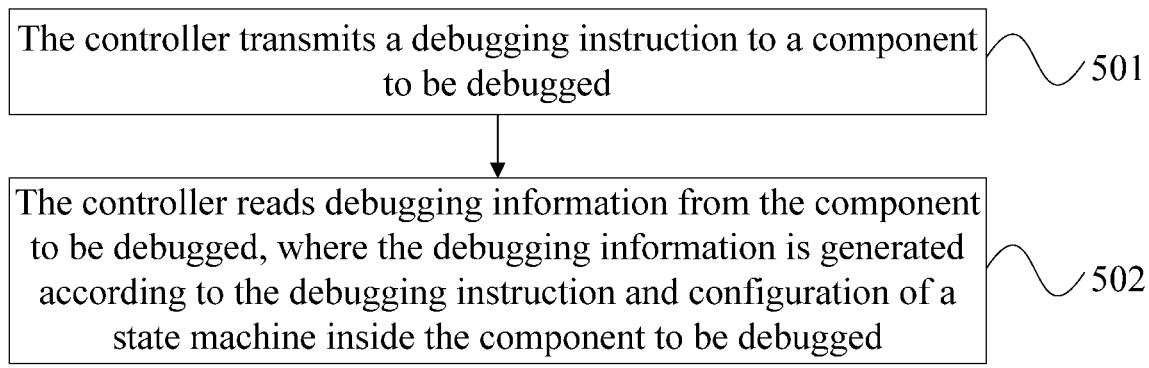
FIG. 5 is a schematic flowchart of a fourth method for debugging according to an embodiment of the present application.

FIG. 5 is a schematic flowchart of a fourth method for debugging according to an embodiment of the present application. The method is executed by a controller (such as CPU), and the method includes the following steps:

S501: the controller transmits a debugging instruction to a component to be debugged.

S502: the controller reads debugging information from the component to be debugged, where the debugging information is generated according to the debugging instruction and configuration of a state machine inside the component to be debugged.

The steps in FIG. 5 correspond to the steps in FIG. 2-FIG. 4, the descriptions of the method shown in FIG. 5 can refer to descriptions of the method shown in FIG. 2-FIG. 4.

The present application provides a method for debugging, where the controller transmits a debugging instruction to a component to be debugged, and reads debugging information from the component to be debugged, where the debugging information is generated according to the debugging instruction and configuration of a state machine inside the component to be debugged. Then an SW level debugging operation of component on system on chip can be achieved, which improves the debugging efficiency of these components with large amounts of data flow on system on chip.

In one possible implementation, where the debugging instruction includes a first debugging instruction indicating breakpoint at a first position; where before S502, the method further including: the controller receives a first information indicating hitting of the breakpoint at the first position, from the component to be debugged.

In one possible implementation, the debugging instruction includes a second debugging instruction indicating stepping at a second position; or the debugging instruction includes a third debugging instruction indicating resuming the debugging operation.

In one possible implementation, the component to be debugged includes an accelerator running a DNN, where the first position includes tile Y of layer X or layer X, where X and Y are positive integer greater than 1, the second position is tile Y+1 or layer X+1.

Figure 6:
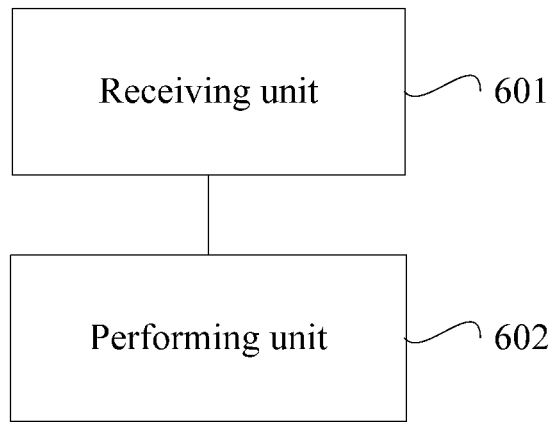
FIG. 6 is a structural view of a first component to be debugged according to an embodiment of the present application.

FIG. 6 is a structural view of a first component to be debugged according to an embodiment of the present application, as shown in FIG. 6, where the component to be debugged includes: a receiving unit 601 and a performing unit 602.

The receiving unit 601 is configured to receive a debugging instruction from a controller.

The performing unit 602 is configured to perform debugging operation according to the debugging instruction and configuration of a state machine inside the component to be debugged.

The present application provides a component to be debugged, where the receiving unit 601 is configured to receive a debugging instruction from a controller, the performing unit 602 is configured to perform debugging operation according to the debugging instruction and configuration of a state machine inside the component to be debugged. Then an SW level debugging operation of component on system on chip can be achieved, which improves the debugging efficiency of these components with large amounts of data flow on system on chip.

Figure 7:
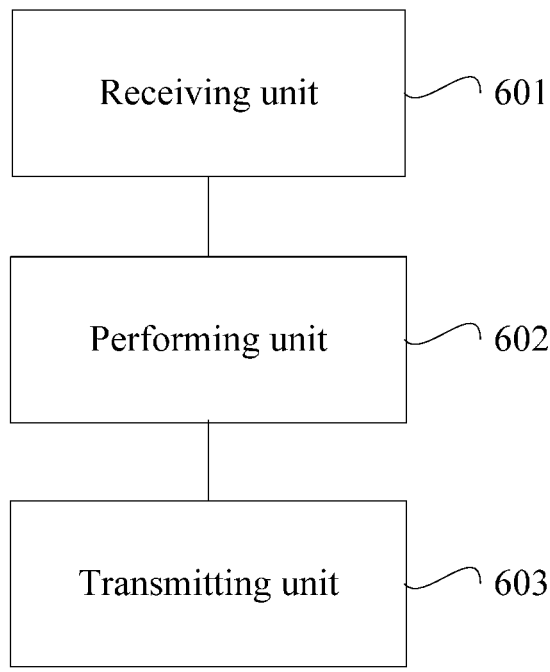
FIG. 7 is a structural view of a second component to be debugged according to an embodiment of the present application.

FIG. 7 is a structural view of a second component to be debugged according to an embodiment of the present application, as shown in FIG. 7, based on FIG. 6, the debugging instruction includes a first debugging instruction indicating breakpoint at a first position, and the performing unit 602 is further configured to: execute the debugging operation till the first position according to the configuration of the state machine; suspend the debugging operation at the first position according to the configuration of the state machine, the component to be debugged further includes a transmitting unit 603, where the transmitting unit 603 is configured to transmit a first information indicating hitting of the breakpoint at the first position to the controller, according to the configuration of the state machine.

In one possible implementation, the debugging instruction includes a second debugging instruction indicating stepping at a second position; where the performing unit is further configured to execute the debugging operation at the second position according to the configuration of the state machine.

In one possible implementation, the debugging instruction includes a third debugging instruction indicating resuming the debugging operation; where the performing unit is further configured to resume the debugging operation according to the configuration of the state machine.

In one possible implementation, the component to be debugged includes an accelerator running a DNN.

In one possible implementation, the first position includes tile Y of layer X or layer X, where X and Y are positive integer greater than 1, the second position is tile Y+1 or layer X+1.

Figure 8:
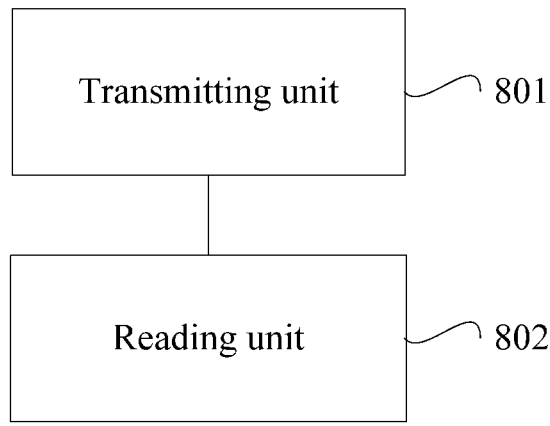
FIG. 8 is a structural view of a first controller according to an embodiment of the present application.

FIG. 8 is a structural view of a first controller according to an embodiment of the present application, as shown in FIG. 8, the controller includes: a transmitting unit 801 and a reading unit 802.

The transmitting unit 801 is configured to transmit a debugging instruction to a component to be debugged. The reading unit 802 is configured to read debugging information from the component to be debugged, where the debugging information is generated according to the debugging instruction and configuration of a state machine inside the component to be debugged.

Figure 9:
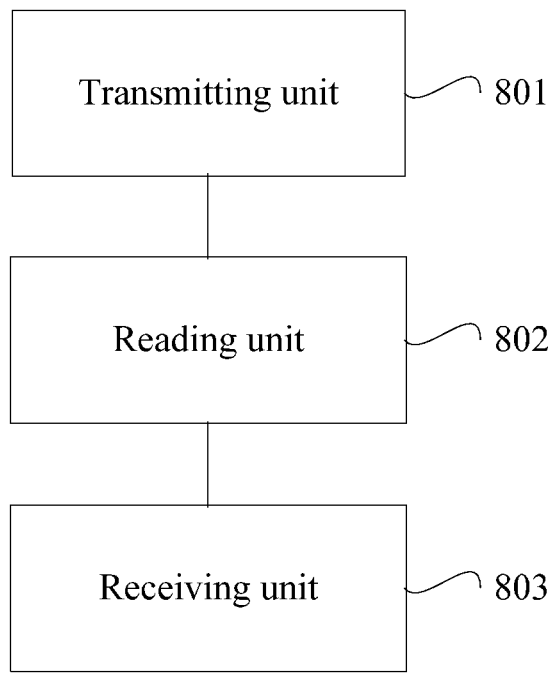
FIG. 9 is a structural view of a second controller according to an embodiment of the present application.

FIG. 9 is a structural view of a second controller according to an embodiment of the present application, as shown in FIG. 9, based on FIG. 8, the debugging instruction includes a first debugging instruction indicating breakpoint at a first position; where the controller further includes a receiving unit 803; the receiving unit 803 is configured to receive a first information indicating hitting of the breakpoint at the first position, from the component to be debugged before the reading unit reads debugging information from the component to be debugged.

In one possible implementation, the debugging instruction includes a second debugging instruction indicating stepping at a second position; or the debugging instruction includes a third debugging instruction indicating resuming the debugging operation.

In one possible implementation, the component to be debugged includes an accelerator running a DNN. The first position includes tile Y of layer X or layer X, where X and Y are positive integer greater than 1, the second position is tile Y+1 or layer X+1.

Figure 10:
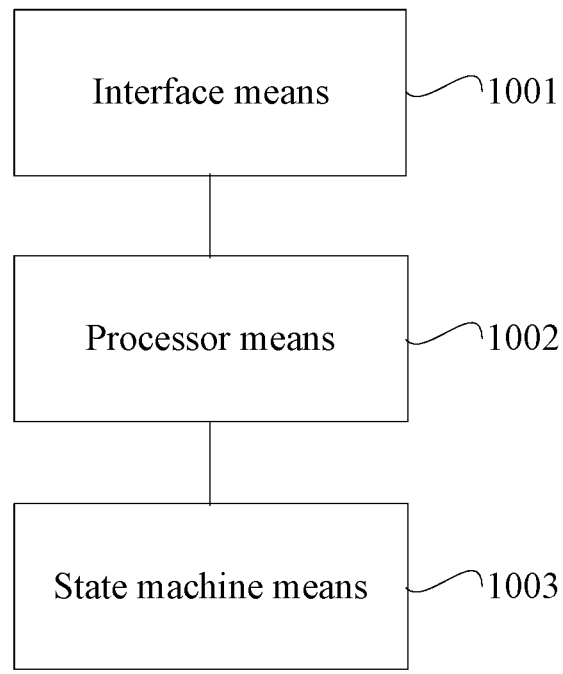
FIG. 10 is a structural view of a third component to be debugged according to an embodiment of the present application.

FIG. 10 is a structural view of a third component to be debugged according to an embodiment of the present application, as shown in FIG. 10, where the component to be debugged includes: an interface means 1001, a processor means 1002 and a state machine means 1003.

The interface means 1001 is configured to receive a debugging instruction from a controller;

The processor means 1002 is configured to perform debugging operation according to the debugging instruction and configuration of the state machine means.

In one possible implementation, the debugging instruction includes a first debugging instruction indicating breakpoint at a first position; where the processor means 1002 is further configured to: execute the debugging operation till the first position according to the configuration of the state machine means; suspend the debugging operation at the first position according to the configuration of the state machine means; and the interface means 1001 is further configured to transmit a first information indicating hitting of the breakpoint at the first position to the controller, according to the configuration of the state machine means 1003.

In one possible implementation, the debugging instruction includes a second debugging instruction indicating stepping at a second position;

where the processor means 1002 is further configured to execute the debugging operation at the second position according to the configuration of the state machine means 1003.

In one possible implementation, the debugging instruction includes a third debugging instruction indicating resuming the debugging operation;

where the processor means 1002 is further configured to resume the debugging operation according to the configuration of the state machine means 1003.

In one possible implementation, the component to be debugged includes an accelerator running a DNN, the first position includes tile Y of layer X or layer X, where X and Y are positive integer greater than 1, the second position is tile Y+1 or layer X+1.

Figure 11:
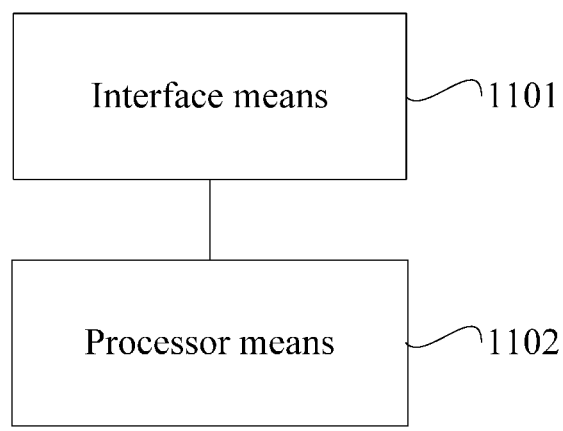
FIG. 11 is a structural view of a third controller according to an embodiment of the present application.

FIG. 11 is a structural view of a third controller according to an embodiment of the present application, as shown in FIG. 11, where the controller includes: an interface means 1101 and a processor means 1102.

The interface means 1101 is configured to transmit a debugging instruction to a component to be debugged;

the processor means 1102 is configured to read debugging information from the component to be debugged, where the debugging information is generated according to the debugging instruction and configuration of a state machine inside the component to be debugged.

In one possible implementation, the debugging instruction includes a first debugging instruction indicating breakpoint at a first position; the interface means 1101 is configured to receive a first information indicating hitting of the breakpoint at the first position, from the component to be debugged before the processor means 1102 reads debugging information from the component to be debugged.

In one possible implementation, the debugging instruction includes a second debugging instruction indicating stepping at a second position; or the debugging instruction includes a third debugging instruction indicating resuming the debugging operation.

In one possible implementation, the component to be debugged includes an accelerator running a DNN, where the first position includes tile Y of layer X or layer X, where X and Y are positive integer greater than 1, the second position is tile Y+1 or layer X+1.

Figure 12:
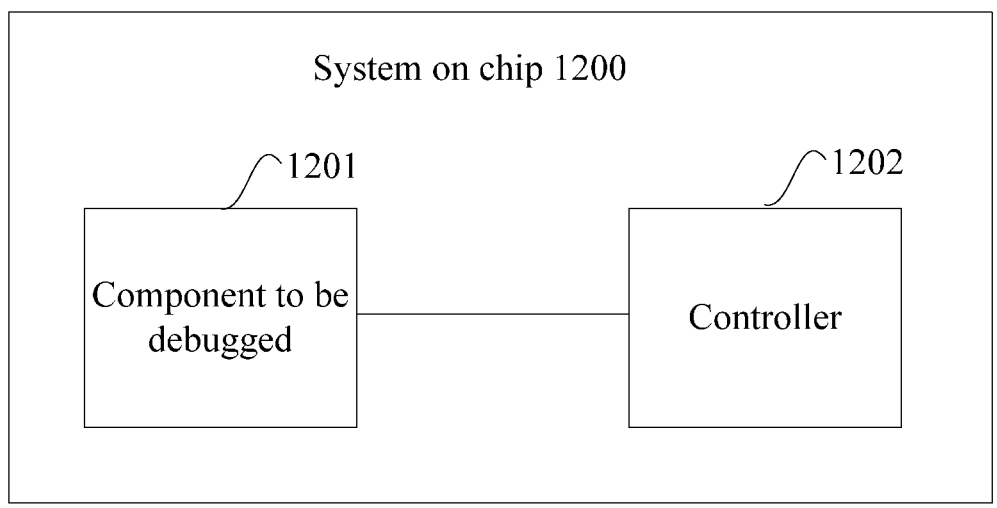
FIG. 12 is a structural view of a system on chip according to an embodiment of the present application.

FIG. 12 is a structural view of a system on chip 1200 according to an embodiment of the present application, as shown in FIG. 12, the system on chip includes: a component to be debugged 1201 and a controller 1202. The component to be debugged can be any of the component to be debugged cited above, and the controller can be any of the controller cited above.

Terms such as "first", "second" and the like in the specification and claims of the present application as well as in the above drawings are intended to distinguish different objects, but not intended to define a particular order.

The term such as "and/or" in the embodiments of the present application is merely used to describe an association between associated objects, which indicates that there may be three relationships, for example, A and/or B may indicate presence of A only, of both A and B, and of B only.

The term "a" or "an" is not intended to specify one or a single element, instead, it may be used to represent a plurality of elements where appropriate.

It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

In the embodiments of the present application, expressions such as "exemplary" or "for example" are used to indicate illustration of an example or an instance. In the embodiments of the present application, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise a random access memory (RAM), a read-only memory (ROM), an electrically erasable programmable ROM (EEPROM), a compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for debugging, comprising:
   receiving, by a component to be debugged, a debugging instruction from a controller;
   performing, by the component to be debugged, debugging operation according to the debugging instruction and configuration of a state machine inside the component to be debugged;
   wherein the debugging instruction comprises a first debugging instruction indicating breakpoint at a first position or a second debugging instruction indicating stepping at a second position;
   wherein the component to be debugged comprises an accelerator running a deep neural network (DNN), and the first position comprises tile Y of layer X or layer X, wherein X and Y are positive integer greater than 1, the second position is tile Y+1 or layer X+1.

2. The method according to claim 1, wherein when the debugging instruction comprises the first debugging instruction;
   the performing, by the component to be debugged, debugging operation comprises:
   executing, by the component to be debugged, the debugging operation till the first position according to the configuration of the state machine;
   suspending, by the component to be debugged, the debugging operation at the first position according to the configuration of the state machine; and
   transmitting, by the component to be debugged, a first information indicating hitting of the breakpoint at the first position to the controller, according to the configuration of the state machine.

3. The method according to claim 1, wherein when the debugging instruction comprises the second debugging instruction;
   the performing, by the component to be debugged, debugging operation comprises:
   executing, by the component to be debugged, the debugging operation at the second position according to the configuration of the state machine.

4. The method according to claim 1, wherein the debugging instruction further comprises a third debugging instruction indicating resuming the debugging operation;
   wherein the performing, by the component to be debugged, debugging operation comprises:
   resuming, by the component to be debugged, the debugging operation according to the configuration of the state machine.

5. A method for debugging, comprising:
   transmitting, by a controller, a debugging instruction to a component to be debugged;
   reading, by the controller, debugging information from the component to be debugged, wherein the debugging information is generated according to the debugging instruction and configuration of a state machine inside the component to be debugged;

wherein the debugging instruction comprises a first debugging instruction indicating breakpoint at a first position or a second debugging instruction indicating stepping at a second position;

wherein the component to be debugged comprises an accelerator running a deep neural network (DNN), and the first position comprises tile Y of layer X or layer X, wherein X and Y are positive integer greater than 1, the second position is tile Y+1 or layer X+1.

6. The method according to claim 5, wherein when the debugging instruction comprises the first debugging instruction;

before the reading, by the controller, debugging information from the component to be debugged, the method further comprising:

receiving, by the controller, a first information indicating hitting of the breakpoint at the first position, from the component to be debugged.

7. The method according to claim 5, wherein:

the debugging instruction further comprises a third debugging instruction indicating resuming the debugging operation.

8. A component to be debugged, comprising an interface, a processor and a state machine;

the interface is configured to receive a debugging instruction from a controller;

the processor is configured to perform debugging operation according to the debugging instruction and configuration of the state machine;

wherein the debugging instruction comprises a first debugging instruction indicating breakpoint at a first position or a second debugging instruction indicating stepping at a second position;

wherein the component to be debugged comprises an accelerator running a deep neural network (DNN), and the first position comprises tile Y of layer X or layer X, wherein X and Y are positive integer greater than 1, the second position is tile Y+1 or layer X+1.

9. The component according to claim 8, wherein when the debugging instruction comprises the first debugging instruction;

the processor is further configured to:

execute the debugging operation till the first position according to the configuration of the state machine;

suspend the debugging operation at the first position according to the configuration of the state machine; and the interface is further configured to transmit a first information indicating hitting of the breakpoint at the first position to the controller, according to the configuration of the state machine.

10. The component according to claim 8, wherein when the debugging instruction comprises the second debugging instruction;

the processor is further configured to execute the debugging operation at the second position according to the configuration of the state machine.

11. The component according to claim 8, wherein the debugging instruction further comprises a third debugging instruction indicating resuming the debugging operation;

wherein the processor is further configured to resume the debugging operation according to the configuration of the state machine.

\* \* \* \* \*